US009736131B2

United States Patent
Khalid et al.

(10) Patent No.: US 9,736,131 B2
(45) Date of Patent: Aug. 15, 2017

(54) SECURE LOGIN FOR SUBSCRIBER DEVICES

(71) Applicant: Cellco Partnership, Arlington, VA (US)

(72) Inventors: Mohammad Raheel Khalid, Budd Lake, NJ (US); Ansar Kassim, Basking Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 562 days.

(21) Appl. No.: 14/035,301

(22) Filed: Sep. 24, 2013

(65) Prior Publication Data

US 2015/0089621 A1    Mar. 26, 2015

(51) Int. Cl.
*H04L 9/32* (2006.01)
*H04L 29/06* (2006.01)

(52) U.S. Cl.
CPC .......... *H04L 63/08* (2013.01); *H04L 63/0807* (2013.01); *H04L 63/0876* (2013.01); *H04L 63/083* (2013.01); *H04L 63/108* (2013.01)

(58) Field of Classification Search
CPC ............. H04L 63/0815; H04L 63/0838; H04L 63/0853; H04L 63/0876; G06F 21/41; G06F 21/44
See application file for complete search history.

(56) References Cited

U.S. PATENT DOCUMENTS

| | | | | |
|---|---|---|---|---|
| 8,910,246 | B2 * | 12/2014 | Whelan | G01S 1/725 726/3 |
| 2010/0050235 | A1 * | 2/2010 | Hardie | H04L 63/126 726/3 |
| 2011/0016382 | A1 * | 1/2011 | Cahill | G06F 17/30896 715/234 |
| 2013/0067555 | A1 * | 3/2013 | Toomey | G06F 21/31 726/9 |
| 2013/0074168 | A1 * | 3/2013 | Hao | H04L 9/3213 726/7 |
| 2013/0212666 | A1 * | 8/2013 | Mattsson | G06Q 20/405 726/9 |
| 2013/0260833 | A1 * | 10/2013 | De Atley | H04B 1/3816 455/558 |
| 2014/0075513 | A1 * | 3/2014 | Trammel | H04L 9/3213 726/4 |

* cited by examiner

*Primary Examiner* — Matthew Smithers
*Assistant Examiner* — Paul Callahan (57) ABSTRACT

A network service may receive an authentication request from a subscriber device, the authentication request including a user credential and a device identifier of the subscriber device. The service may validate the authentication request based at least in part on the included user credential, and when the authentication request is validated, provide an authentication reply to the subscriber device indicative of allowance of the subscriber device to access the service, the authentication reply including a hash token keyed to the device identifier of the subscriber device for use in validation of subsequent authentication requests. The service may further generate a second hash token based on the device identifier of a subsequent authentication request; validate a subsequent authentication request according to the hash token and the second hash token; and when the subsequent authentication request is validated, allowing the subscriber device to access the service.

21 Claims, 5 Drawing Sheets

SECURE LOGIN FOR SUBSCRIBER DEVICES

BACKGROUND

Logging into a network service each time the service is used is considered an annoyance by users, although logging in ensures security via the credentials entered by the user. Several alternatives have arisen to help alleviate the user having to enter credentials on each log in. These alternatives have proven to be limited in utility or to introduce unacceptable insecurities into the login procedure.

As one example, network service providers have attempted to save user credentials on the subscriber device (either in plain text or in encrypted form). For instance, a user passphrase may be stored in a browser cookie or to a protected or encrypted data store of the subscriber device. However, doing so leaves open a vector of attack where a third party may retrieve the credentials from the subscriber device and reuse them for malicious purposes. As another example, service providers have attempted schemes using authentication tokens that are generated by a server upon login and that are only valid for a relatively short period of time. However, these temporary authentication tokens may be easily stolen and reused. As yet a further example, service providers have attempted approaches utilizing storage of information in a secure storage area or requesting simpler forms of identification from users, but these systems have proven to be insecure and easily compromised by those with physical access to a user's subscriber device.

In sum, current systems are unable to securely address user annoyance with repeated manual entry of user credentials in a way that preserves the security of network service login procedures.

DETAILED DESCRIPTION

A network service may receive an authentication request from a subscriber device. For example, a user of the subscriber device may select an application that makes use of the network service, and may enter credentials into the application (e.g., a passphrase for a given username or mobile device number (MDN)). When sent, the authentication request may include the user credentials entered into the subscriber device as well as device information descriptive of the device itself. The device information may include, as some examples, device MDN, source Internet protocol (IP) address, and/or information included on a subscriber identity module (SIM) card such as unique serial number (ICCID) or international mobile subscriber identity (IMSI). The network service may receive and validate the authentication request. Based on the validation, the network service may provide a positive or negative authentication reply to the subscriber device in response. The authentication reply may indicate to the subscriber device whether the subscriber device has been granted access the network service.

Validation of the authentication request may include confirming with a database that the authentication request does not exceed a maximum count of authentication requests during a constrained period of time. This may be done to preserve network resources, as well as to avoid certain types of brute force attack. For example, the network service may determine how often various elements of the authentication request (e.g., MDN, IP address, username) have been used in a period of time (e.g., 15 minutes). If too many such requests are received, the network service may prohibit further login attempts from the overused elements of the request for a period of time (e.g., ignore any requests from the MDN or IP address for 30 minutes, etc.). Validation of the authentication request may further include validating the received user credentials using an access manager to confirm, according to maintained user information, that a correct passphrase for the given username has been received.

When a login attempt using entered credentials is successful, the authentication reply may further include a hash token for use in subsequent authentication requests. This hash token may be generated on the server-side (e.g., by the network service) using a hashing algorithm with inputs including a combination of one or more device identifiers of the subscriber device (e.g., MDN, IP, SIM information, username), and a salt value. If the subscriber device later attempts to make use of the network service, the device may provide the hash token and other device information to the network service in a subsequent authorization request, without requiring the user to re-enter his or her credentials for validation.

Rather than comparing entered credentials to re-authenticate the subscriber device, the network service may compute a second hash token using the information of the subsequent authorization request, and may confirm that the second hash token matches the stored hash token included in the subsequent authorization request. As the stored hash token is tied to the device information of the subscriber device or SIM card (and to the lifetime of a utilized salt value), the stored hash token is therefore unusable if sent from a device other than the subscriber device or SIM to which it is tied. Thus, the system allows for storage of credentials on a subscriber device in a form that allows for automated re-authentication to the network service, without subjecting the network service to increased possibility that the saved credentials could be reused by a malicious attacker or unauthorized device to obtain access.

Figure 1:
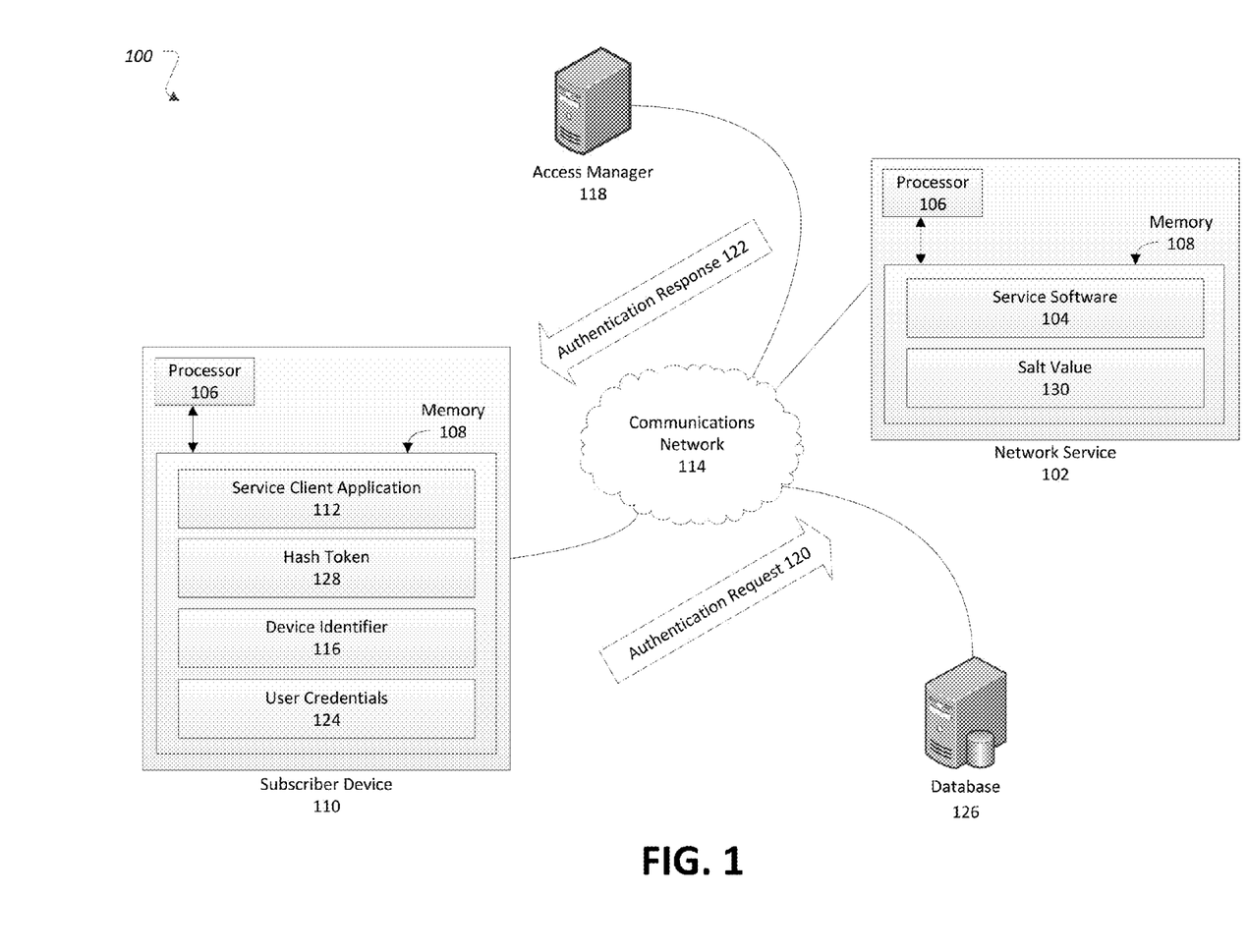
FIG. 1 illustrates an exemplary system for providing an enhanced secure login system for subscriber devices.

FIG. 1 illustrates an exemplary enhanced secure login system 100 for subscriber devices 110. The system 100 may include a network service 102 configured to provide service functionality to users of subscriber devices 110. The network service 102 may be implemented as one or more computing devices having processors 106, memories 108, and service software 104 to support the functionality of the network service 102. The network service 102 may make use of an access manager 118 and a subscriber database 126 to support authentication of the subscriber devices 110 as authorized to use the network service 102. The system 100 may further include one or more subscriber devices 110 in communication over a communications network 114. The subscriber devices 110 may include processors 106 that execute instructions stored on memories 108, such as those of a service client application 112 in communication with the network service 102 to provide service functionality to the subscriber device 110. The subscriber devices 110 may further maintain additional information in the memory 108 related to device authentication, such as device identifiers 116, user credentials 124, and hash tokens 128. The system 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

The network service 102 may be implemented as one or more network-capable computing devices. The network service 102 computing devices may be implemented as a combination of hardware, software and firmware, and may include service software 104 stored on non-transitory memories 108 for causing one or more computer processors 106 to perform the operations of the network service 102 described herein. Alternatively, the network service 102 and its components may be provided as hardware or firmware, or combinations of software, hardware and/or firmware.

The subscriber device 110 may be any device configured to be used by a subscriber to interact with services, such as those provided by the network service 102. As with the network service 102, the subscriber devices 110 also may be implemented as a combination of hardware, software and firmware, and may include one or more software applications or processes stored on non-transitory memories 108 for causing one or more computer processors 106 to perform the operations of the subscriber device 110 described herein. One such application may be a service client application 112, while in other examples, some or all of the functionality of the subscriber device 110 discussed herein may be implemented by other components, such as in whole or in part by embedded software installed on a memory 108 of the device 110. Exemplary subscriber devices 110 may include any of various models of networked device, such as voice over Internet protocol (VoIP) phones, mobile telephones, "softphone" software applications, media content processing systems such as cable set top boxes, computers such as laptops, desktops, and tablet devices, or other types of computing devices capable of executing applications and communicating with network services 102.

The communications network 114 may provide communications services, including packet-switched network services (e.g., Internet access, VoIP communication services) to subscriber devices 110 such as services provided by the network service 102. Exemplary communications networks 114 may include the public switched telephone network (PSTN), a VoIP network, a cellular telephone network, a fiber optic network, and a cable television network. To facilitate communications, each subscriber device 110 on the communications network 114 may have its own device identifier 116 used to indicate, reference, or selectively connect the subscriber's device 110 to the communications network 114. Exemplary device identifiers 116 may include telephone numbers, MDNs, common language location identifier (CLLI) codes, SIM card ICCID or IMSI identifiers, device IP addresses, device media access control (MAC) addresses, input strings or device-associated usernames, and universal resource identifiers (URIs), as some possibilities.

The network service 102 may be configured to verify whether the subscriber devices 110 may be authorized to use the network service 102. To do so, the network service 102 may be configured to receive authentication requests 120 requesting use of the network service 102, and may respond to the request with authentication responses 122. Accordingly, the network service 102 may respond back to the subscriber devices 110 via the communications network 114 whether or not access by the subscriber devices 110 to the network service 102 is granted.

The authentication requests 120 may include information used by the network service 102 to aid in the determination of whether access should be granted to the requesting devices. For example, an authentication request 120 may include one or more device identifiers 116 of the subscriber device 110 (e.g., MDN, information included on a SIM card such as ICCID or IMSI, etc.) requesting access to the network service 102. As another example, the authentication request 120 may include user credentials 124. User credentials 124 may include various types of information that may be used to identify or authenticate a user or device 110, such as passwords, swipe codes, fingerprints, voice prints, or other types of information typically entered into the subscriber device 110 to verify identity of the user of the subscriber device 110. These and other types of user-entered credentials 124 may be referred to herein generally as passphrases. In some cases, user credentials 124 may be entered into the subscriber device 110 directly by a user, while in other cases the user credentials 124 information may be received by the subscriber device 110 by other means, such as from storage, or by near-field communication with another device, as some examples.

As a first authentication factor, the network service 102 may be configured to utilize a threshold governor mechanism to restrict a number of authentication requests 120 that may be processed from a subscriber device 110 within a constrained period of time. As one example, the network service 102 may utilize a 15 minute threshold governor configured to only allow a predetermined number of authentication requests 120 within the 15 minute period of time. For instance, if one or more of the MDN, username, or SIM information included in the authentication request 120 are incorrect, then only so many additional authentication requests 120 for that MDN, username, or SIM may be allowed within the constrained period of time. If the predetermined number of failed authentication requests 120 occurs, then the network service 102 may set a timeout period (e.g., 30 minutes from the setting of the timeout period) such that additional time may be required before additional authentication requests 120 for the MDN, username, or SIM information exceeding the threshold may be processed. Further aspects of determination of threshold governor timeouts by the database 126 are discussed in detail with respect to process 400 below.

As a second authentication factor, the network service 102 may be configured to provide the received user credentials 124 to an access manager 118. The access manager 118 may be configured to compare the user credentials 124 with stored security information, and may identify authorized subscriber devices 110, users, or both. In some cases, the access manager 118 may maintain the security information, while in other cases the access manager 118 may utilize the database 126 to maintain information identifying users or subscriber devices 110 that may be authorized to use the network service 102. If the access manager 118 determines that the user and/or device 110 is authorized, the access manager 118 may be configured to inform the network service 102, which may accordingly provide an authentication response 122 the subscriber device 110 indicating a granting of access.

For authentication responses 122 granting access, the access manager 118 may be further configured to generate a hash token 128 based on the received authentication request 120, such that upon successful authentication the access manager 118 may provide the hash token 128 back to the subscriber device 110 to use in subsequent login attempts. The hash token 128 may be generated based on a combination of one or more device identifiers 116 (e.g., username/ MDN, SIM information, IP address, a randomly generated identifier such as the Settings. Secure.ANDROID_ID identifier generated on initial device 110 boot) or optionally other device information (e.g., version or other information regarding installed applications utilizing the access manager 118 for authentication, version or other information regarding other applications installed on the device 110), such that the hash token 128 may be keyed to only allow subsequent access to the same device 110 to which it was issued. For example, the access manager 118 may use a hashing algorithm to produce an output digest of a specified length to use as the hash token 128, based one or more of the aforementioned inputs. Exemplary hashing algorithms may include Sha-1, Sha-2, or Md5, as some examples.

The access manager 118 further utilizes a salt value 130 as an additional input to the hashing algorithm such that the salt value 130 additionally alters the output hash token 128. To provide a further level of security of the hash token 128, the salt value 130 may be periodically changed, thereby obsoleting any hash tokens 128 saved by subscriber devices 110 using the old salt value 130. As one example, a new salt value 130 may be applied to the hashing algorithm every N days (e.g., 30 days) or after a predetermined number of logins, thereby forcing a manual subscriber login and new hash token 128 generation at various intervals.

In some cases, the salt value 130 may vary according to device 110 characteristics. For example, different salt values 130 may be provided for different device 110 operating systems (e.g., the access manager 118 may utilize a different salt value 130 for a device 110 running the Apple iOS operating system as compared to a device running the Android operating system). As another example, different salt values 130 may be provided according to type of network connectivity of the subscriber device 110 (e.g., the access manager 118 may utilize a different salt value 130 for 3G devices as compared to 4G devices).

As explained in detail below, the hash token 128 may be stored by the subscriber device 110, and included in subsequent authentication requests 120 in place of user-entered user credentials 124, thereby providing for the automated login of the subscriber device 110 to the service 102 for subsequent authentication requests 120. To ensure security of the hash token 128, the access manager 118 may store the hash token 128 using various operating system-specific secure storage options. For example, the access manager 118 may store the hash token 128 using the keychain manager included in the Apple iOS operating system. As another example, the access manager 118 may store the hash token 128 under an account of an application-specific unique user associated with the application, such that the default mode of files the application creates is to be only readable and writeable by the creator's user identifier. As yet a further example, the access manager 118 may store the hash token 128 in a data folder of the application that is accessible only by the application itself.

Figure 2:
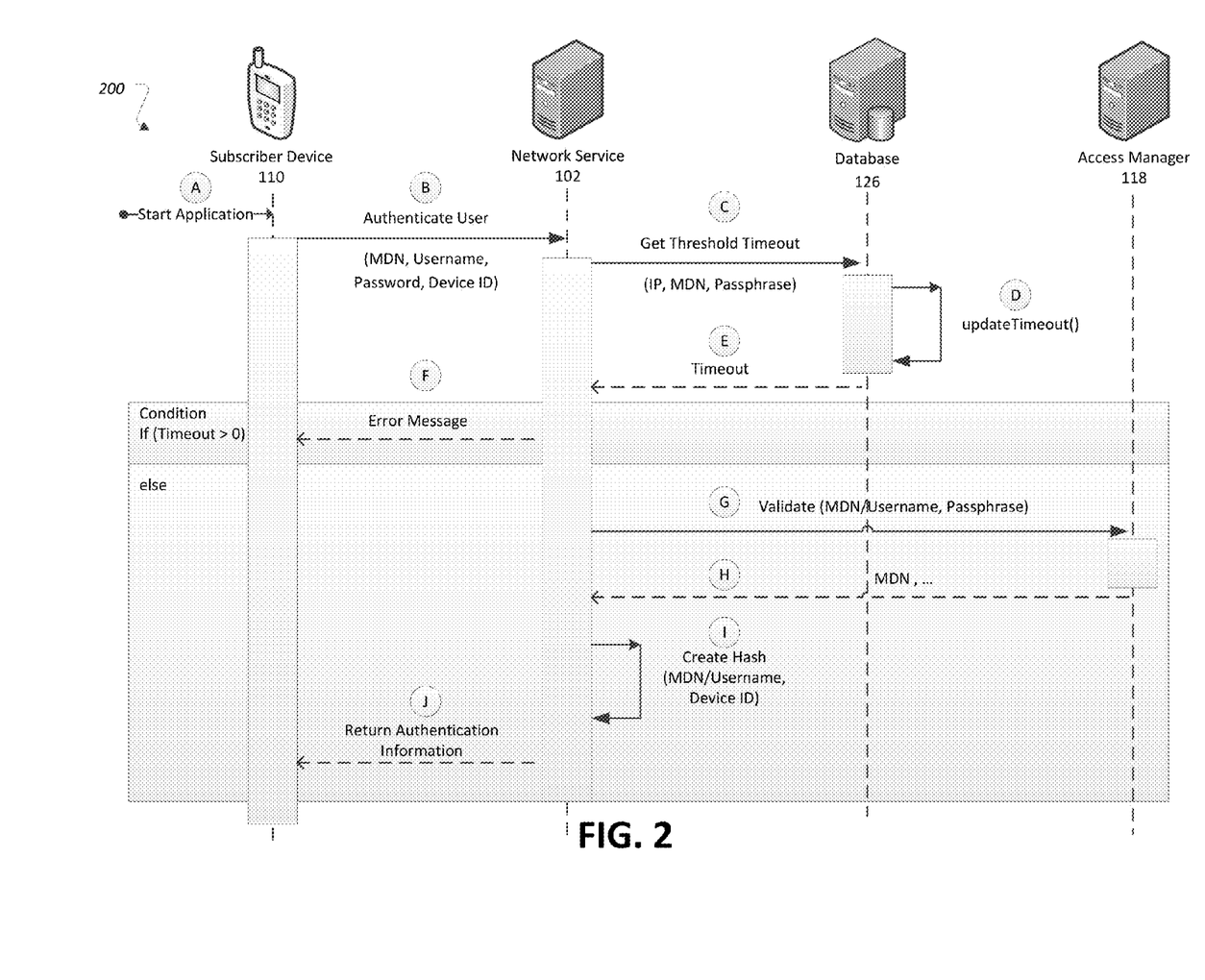
FIG. 2 illustrates an exemplary initial authentication request data flow of a subscriber device requesting access to a network service.

FIG. 2 illustrates an exemplary initial authentication request data flow 200 of a subscriber device 110 requesting access to a network service 102. The data flow 200 may be performed, for example, by the subscriber device 110 executing a service client application 112 and in communication over a communications network 114 with a network service 102 executing service software 104.

More specifically, at index (A) the subscriber device 110 receives an indication that use of the network service 102 is requested. For example, a user may select of an icon on a display of the subscriber device 110 to cause the subscriber device 110 to invoke a service client application 112. When invoked, the service client application 112 may be configured to cause the subscriber device 110 to prompt the user for user credentials 124 to be provided in an authentication request 120 to the network service 102. As one example, the service client application 112 may prompt the user to enter or select a username and enter a passphrase, to enter only a passphrase based on a given username or MDN, or to enter or otherwise provide other user credentials 124 that may be associated with a user or device 110.

At index (B), the subscriber device 110 provides an authentication request 120 to the network service 102. The authentication request 120 may include the user credentials 124 provided at index (A). The subscriber device 110 may further identify additional information to include in the authentication request 120, such as a MDN of the subscriber device 110 and/or a unique identifier of the subscriber device 110 such as device IP address or one or more elements of SIM information (e.g., ICCID, IMSI, etc.). The subscriber device 110 may send the authentication request 120 including the user credentials 124 and the device identifiers 116 to the network service 102 for verification.

At index (C), responsive to receipt of the authentication request 120, the network service 102 requests a threshold timeout from the database 126. The request to the database 126 for timeout information may include query criteria to use to identify the number or remaining number of login attempts of the authentication request 120, as discussed below with respect to the process 400. For instance, the query criteria to the database 126 may include allow the network service 102 to determine how many remaining login attempts are available in an constrained period of time per IP address of the subscriber device 110, MDN of the subscriber device 110, and/or a passphrase entered into the subscriber device 110.

At index (D), the database 126 updates the threshold timeout based on the received request for timeout information. For instance, the database 126 may add an entry to the database 126 set to an initial timeout (e.g., zero) for the IP address, MDN, or passphrase, or, for repeat attempts, may update the timeouts for the received query criteria indicative of the subscriber device 110. The database 126 may further return a timeout to wait based on the IP address, MDN, and/or passphrase associated of the authentication request 120.

At index (E), the database 126 returns the threshold timeout to the network service 102. Based on the returned value, the network service 102 may determine, as a first factor of authentication, whether the timing of the authentication request 120 allows it to be processed. If the authentication request 120 indicates that no additional authentication requests 120 are allowable within the constrained period of time, then the data flow 200 may provide an authentication response 122 denying the authentication request 120 as illustrated at index (F). Otherwise, processing of the authentication request 120 may continue as illustrated at index (G).

At index (G), the network service 102 validates the user credentials 124 and device identifier 116 using the access manager 118. The access manager 118 may accordingly determine, as a second authentication factor, whether the user credentials 124 and device identifier 116 match system 100 information allowing access to the network service 102.

The access manager 118 provides the result of the validation request back to the network service 102 at index (H).

At index (I), if the network service 102 identifies that the validation was successful, the network service 102 creates a hash token 128. The hash token 128 may be created by the network service 102 based on a combination of one or more device identifiers 116 of the subscriber device 110 and a salt value 130. At index (J), if validation of the subscriber device 110 is successful, the network service 102 provides the hash token 128 to the subscriber device 110 in a successful authentication response 122 provided by data flow 200. The hash token 128 may then be used by the subscriber device 110 in subsequent login attempts.

Figure 3:
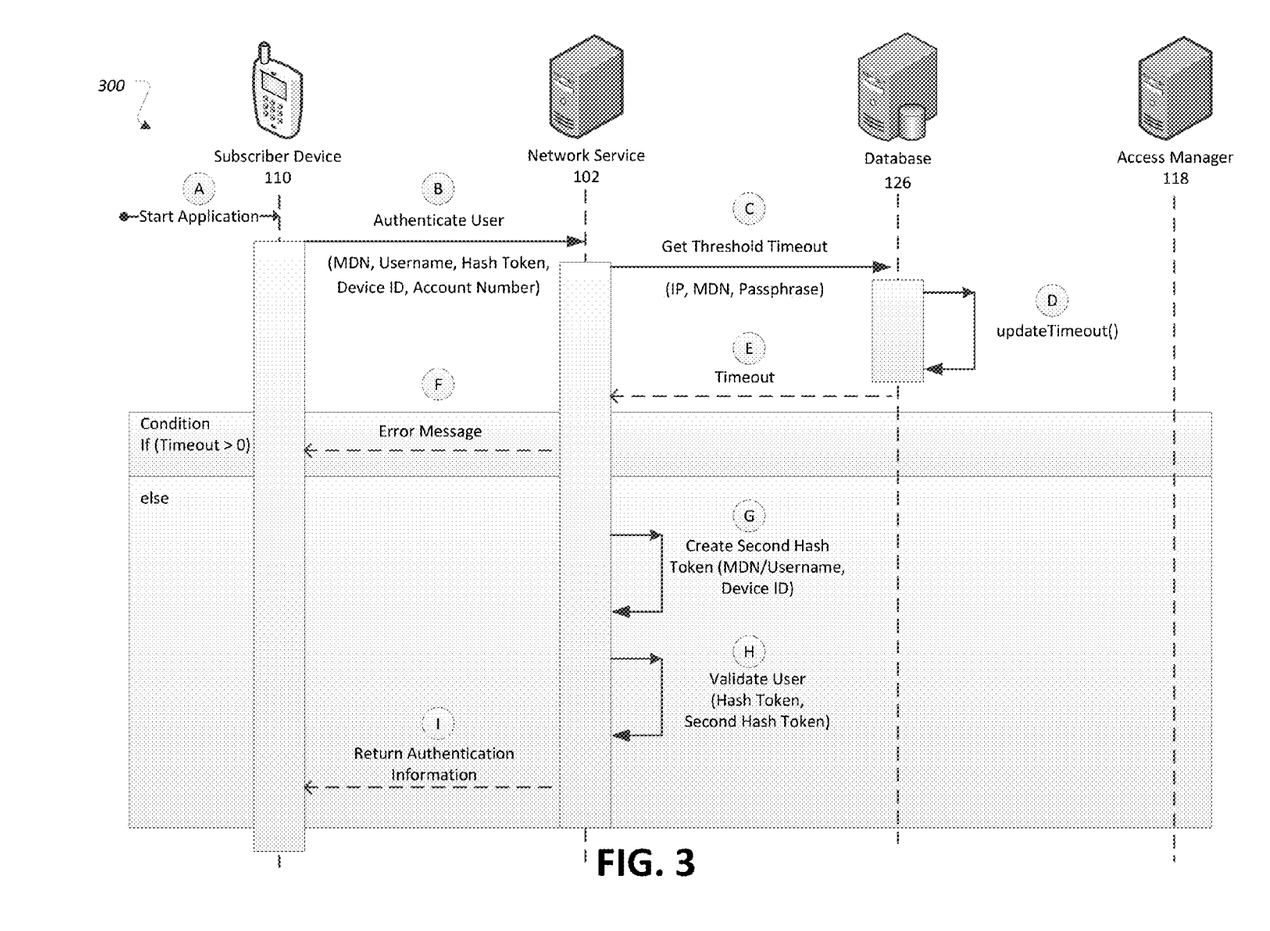
FIG. 3 illustrates an exemplary subsequent authentication request data flow of a subscriber device requesting access to a network service using a hash token.

FIG. 3 illustrates an exemplary data flow 300 for a subsequent authentication request 120 by the subscriber device 110 requesting access to a network service 102 using a hash token 128. The data flow 300 may be performed, for example, by the subscriber device 110 executing a service client application 112 and in communication with a network service 102 over a communications network 114.

As with the data flow 200, at index (A) of the data flow 300 the subscriber device 110 receives an indication that use of the network service 102 is requested. For example, the user may select an icon of a service client application 112 to cause the subscriber device 110 to invoke the service client application 112. However, as compared to the data flow 200, the service client application 112 may identify that the hash token 128 is stored in a memory 108 of the subscriber device 110, and may accordingly decide to automatically include the hash token 128 in an authentication request 120, without prompting the user of the subscriber device 110 for user credentials 124. In some examples, the user interface of the service client application 112 may display a password field as including masked passphrase information, to indicate to a user that the user credentials 124 have been remembered by the subscriber device 110 and do not require reentry.

At index (B), the subscriber device 110 provides the authentication request 120 to the network service 102. Rather than including a passcode, the subscriber device 110 may instead send the authentication request 120 including the hash token 128 and the device identifiers 116 for verification.

At indexes (C) through (E), responsive to receipt of the authentication request 120, the network service 102 may determine, as a first factor of authentication, whether the timing of the authentication request 120 allows it to be processed, as discussed above with respect to the data flows 200. If the authentication request 120 indicates that no additional requests 120 are allowable, then the data flow 300 may provide an authentication response 122 denying the authentication request 120 as illustrated at index (F). Otherwise, processing of the authentication request 120 may continue as illustrated at index (G).

At index (G), the network service 102 creates a hash token 128. For example, in a manner similar to as done at index (I) of the data flow 200, the network service 102 may create the based on the user credentials 124, device identifiers 116, and a salt value 130. At index (H), as a second authentication factor, the network service 102 validates the hash token 128 of the authentication request 120 with the hash token 128 created at index (G) to verify that the hash tokens 128 match. Notably, the comparison of the newly created hash token 128 and the previously created has token 128 does not require the comparison of user-entered credentials 124. The access manager 118 provides the result of the validation request back to the subscriber device 110 at index (I).

Figure 4:
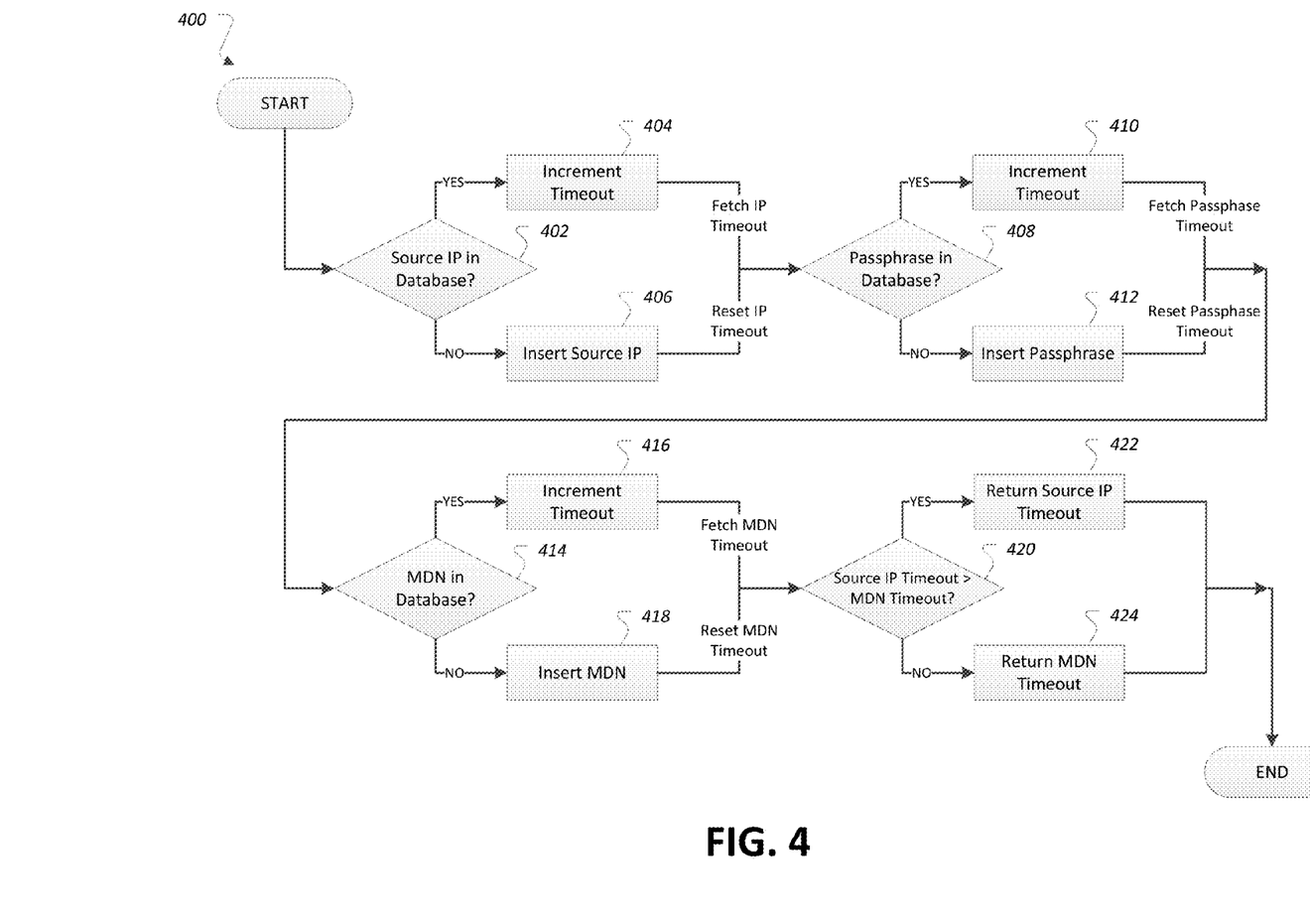
FIG. 4 illustrates an exemplary process for determining a threshold governor timeout.

FIG. 4 illustrates an exemplary process 400 for determining threshold governor timeouts. The system 100 may utilize the process 400 to verify whether too many authentication requests 120 received in a period of time are using the same particular elements of the authentication request 120 (e.g., from the same mobile device number (MDN), Internet protocol (IP) address, username, etc.). If too many such requests 120 have been received, the system 100 may prohibit further login attempts from the overused elements for a period of time (e.g., prohibit attempted logins from an overused MDN for 30 minutes). The process 400 may be performed, for example, by a database 126 in communication with a network service 102 configured to perform validation services for the network service 102.

At decision point 402, the database 126 identifies whether a first device identifier 116 (e.g., source IP address) of a received authorization request 120 is included in a source IP timeout value record in the database 126. If so, at block 404 the database 126 increments the timeout value in the database 126 record. In some examples, the database 126 may increment the timeout value for each received request 120 including the source IP address, while in other examples, the database 126 may increment the timeout value only after reaching a threshold number of requests 120 greater than one. In some examples, the increment to the timeout value may add a fixed amount of time to the timeout value (e.g., 15 second, one minute), while in other cases the increment may add a greater amount of time for each additional request 120 (e.g., doubling the timeout value for each additional failed request 120). The database 126 may further fetch the resultant source IP timeout value from the identified source IP timeout value record. If the first device identifier 116 is not included in the database 126, at block 406 the database 126 adds a source IP timeout value record to the database 126 including a default timeout value (e.g., zero or a short timeout value).

At decision point 408, the database 126 identifies whether a user credential 124 of a received authorization request 120 (e.g., a username or a passphrase provided for a username) is included in a user credential 124 timeout value record the database 126. If so, at block 410 the database 126 increments and provides the timeout value in the database 126 record similar to as discussed above with respect to block 404. If not, at block 412 the database 126 adds a user credential 124 timeout value record to the database 126 including a default timeout value similar to as discussed above with respect to block 406.

At decision point 414, the database 126 identifies whether a second device identifier 116 (e.g., MDN) of a received authorization request 120 is included in an MDN timeout value record the database 126. If so, at block 416 the database 126 increments and provides the MDN timeout value in the database 126 record similar to as discussed above with respect to block 404. If not, at block 418 the database 126 adds an MDN timeout value record to the database 126 including a default timeout value similar to as discussed above with respect to block 406.

At decision point 420, the database 126 determines whether the first device identifier 116 timeout value (e.g., IP timeout value) exceeds the second device identifier 116 timeout value (e.g., MDN timeout value). If so, at block 422 the database 126 returns the IP timeout value. Otherwise, at block 424 the database 126 returns the MDN timeout value. Blocks 422 and 424 may further return the user credential 124 timeout value, or may instead return the user credential 124 timeout value if it exceeds the greater of the first device identifier 116 timeout and the second device identifier 116 timeout. After blocks 422 and 424, the process 400 ends.

Figure 5:
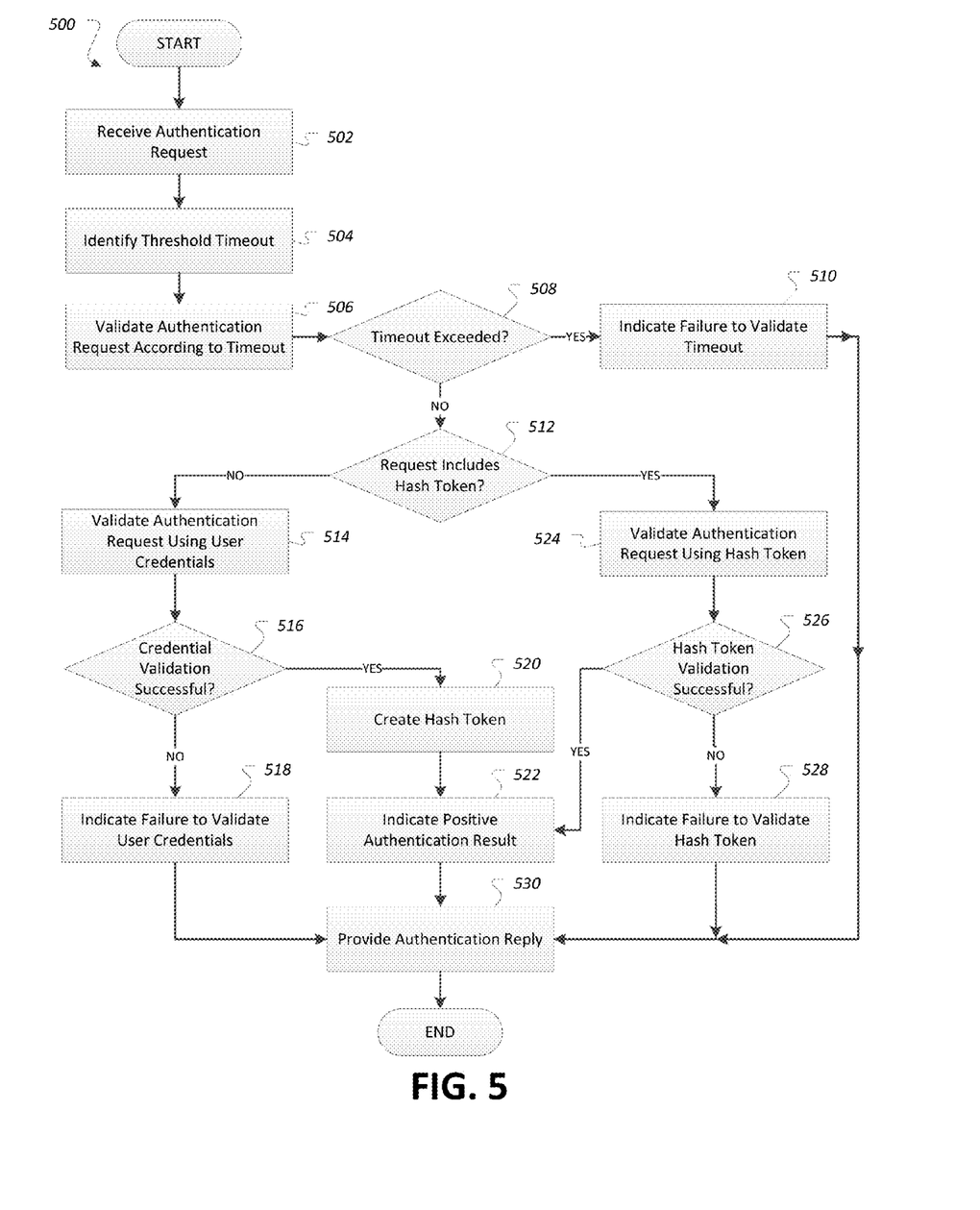
FIG. 5 illustrates an exemplary process for using the enhanced secure login system for subscriber devices.

FIG. 5 illustrates an exemplary process 500 for using the enhanced secure login system 100 for subscriber devices 110. The process 500 may be performed, for example, by a network service 102 in communication with subscriber devices 110, an access manager 118, and a database 126 over a communications network 114.

At block 502, the network service 102 receives an authentication request 120 from a subscriber device 110. For example, a user of the subscriber device 110 may invoke a service client application 112 that requests use of the network service 102.

At block 504, the network service 102 identifies threshold governor timeouts. For example, the network service 102 may utilize a database 126 for threshold governor timeouts as discussed in detail above with respect to the process 400 of FIG. 4.

At block 506, the network service 102 validates the received authentication request 120 according to the threshold governor timeouts. For example, the network service 102 may determine, based on the timeouts, whether the network service 102 may allow further authentication requests 120 for device identifiers 116 included in the authentication request 120 within a constrained period of time specified by the network service 102 (e.g., 15 minutes, 30 minutes, etc.).

At decision point 508, if the network service 102 determines that the authentication request 120 exceeds one or more threshold timeouts, control passes to block 510. Otherwise, control passes to decision point 512.

At block 510, the network service 102 indicates failure of the timeout validation. For example, the network service 102 may inform the database 126 of the failed login attempt to inform processing of future authentication requests 120 threshold timeouts. The database 126 may log the failed attempt and perform corrective actions, such as increase threshold governor timeouts for the failed timeouts. As another example, the network service 102 may identify a return value indicative of a negative timeout validation to include in an authentication response 122 to the subscriber device 110.

At decision point 512, the network service 102 identifies whether the authentication request 120 includes a hash token 128. For example, the authentication request 120 may include a hash token 128 previously generated by the system 100 upon an earlier successful validation of user credentials 124 received from the subscriber device 110. If the authentication request 120 includes a hash token 128, control passes to block 514. Otherwise, control passes to block 524.

At block 514, the network service 102 validates the authentication request 120 using user credentials 124. For instance, the network service 102 may utilize an access manager 118 to validate user credentials 124 included in the authentication request 120, such as a passphrase for a username of a user of the subscriber device 110. As one example, the network service 102 may provide the user credentials 124 to the access manager 118, and may receive a positive or negative response from the access manager 118 indicative of whether the user credentials 124 are valid. At decision point 516, if the credential validation is unsuccessful, control passes to block 518. Otherwise, control passes to block 520.

At block 518, the network service 102 indicates failure to validate the user credentials 124. For example, the network service 102 may inform the database 126 of the failed login attempt to affect processing of threshold timeouts for future authentication requests 120. As another example, the network service 102 may identify a return value indicative of a negative user credential 124 validation to include in an authentication response 122 to the subscriber device 110.

At block 520, the network service 102 creates a hash token 128. The network service 102 may generate the hash token 128 based on the device identifiers 116, such that the hash token 128 may be keyed to only allow subsequent access to the same subscriber device 110 to which it was issued. The network service 102 may use a hashing algorithm to produce an output digest of a specified length to use as the hash token 128, based on the aforementioned inputs. The network service 102 further utilizes a salt value 130 as an additional input to the hashing algorithm such that the salt value 130 additionally alters the output hash token 128. To provide a further level of security of the hash token 128, the salt value 130 may be periodically changed. As one example, a new salt value 130 may be applied to the hashing algorithm every 30 days.

At block 522, the network service 102 indicates successful validation of the user credentials 124. For example, the network service 102 may identify a return value indicative of a positive validation to include in an authentication response 122 to the subscriber device 110. The generated hash token 128 may also be included in the authentication response 122 for use by the subscriber device 110 in later authentication requests 120. For example, the hash token 128 may be included in responses 122 to requests 120 in which user credentials 124 are used to validate the authentication request 120.

At block 524, the network service 102 validates the authentication request 120 using the hash token 128. For instance, the network service 102 may create a second hash token 128 based on the user credentials 124 and device identifiers 116 of the authentication request 120, as well as based on a salt value 130 utilized by the hashing algorithm of the network service 102. The network service 102 may accordingly validate the hash token 128 of the authentication request 120 with the second hash token 128. In order to be valid, the hash token 128 should match the second hash token 128. At decision point 526, if validation of the hash token 128 is successful, control passes to block 522. Otherwise, control passes to block 528.

At block 528, the network service 102 indicates failure to validate the hash token 128. For example, the network service 102 may inform the database 126 of the failed login attempt to affect processing of threshold timeouts for future authentication requests 120. As another example, the network service 102 may identify a return value indicative of a negative hash token 128 validation to include in an authentication response 122 to the subscriber device 110. In some cases, failure to validate the hash token 128 may be a result of a change in the salt value 130 by the network service 102. In such a case, to log in the user may be required to enter his or her user credentials 124 for validation and send another authentication request 120.

At block 530, the network service 102 provides an authentication response 122 to the subscriber device 110, responsive to the received authentication request 120. The authentication response 122 may include a return value indicative of whether the validation of the authentication response 122 was positive (e.g., block 522), or negative (e.g., blocks 510, 518 or 528). After block 530, the process 500 ends.

Thus, the system 100 may allow for storage of user credentials 124 associated with an online account on a subscriber device 110 (e.g., the hash token 128) in such a form that the credentials that cannot be reused by attacker to obtain access to the network service 102 from an unauthorized device. As the stored hash token 128 is tied to a subscriber device 110 that was previously authenticated using user credentials 124, the stored hash token 128 is unusable if sent from a device other than the subscriber device 110 to which it is tied using the hashing algorithm in use by the network service 102. Moreover, further security of the hash token 128 may be maintained by use of a rotating salt value 130 kept secret to the network service 102, decreasing the likelihood that an attacker may be able to forge valid hash tokens 128 and also enforcing controlled hash token 128 expiration. By way of these enhancements, a network service 102 may allow for secure validation of subsequent authentication requests 120, without compromising access security to the network service 102.

Variations on the process 500 are possible. As one example, additional authentication mechanisms may be combined with use of the hash token 128 to provide further security. For instance, environmental information regarding the subscriber device 110 may be identified and validated by the network service 102 in the provisioning of an authentication response 122. Exemplary environmental information to be validated may include the location of the subscriber device 110 being consistent with usage of the subscriber device 110 (e.g., determined using global positioning or time distance of arrival from network base stations), or that the subscriber device 110 is at a location and time consistent with usage of the subscriber device 110 (e.g., at work during business hours or at home during evening hours).

As another example, the network service 102 may validate the hash token 128 of the authentication request 120 against a second hash token 128 created using a current salt value 130 and also third hash token 128 created using a previous salt value 130. If the hash token 128 matches the third hash token 128 rather than the second hash token 128, then the network service 102 may identify that the hash token 128 has expired. If an expired hash token 128 is identified, the network service 102 may provide back the third hash token 128 in the authentication response 122, allowing the subscriber device 110 to pick up updated credentials using the current salt value 130 without requiring a full re-authentication. As yet a further example, the authentication request 120 may include hash tokens 128 created using both the current salt value 130 and also the previous salt value 103, and the network service 102 may require both hash tokens 128 to be valid before allowing access.

In general, computing systems and/or devices, such as the network service 102, subscriber device 110, access manager 118, and database 126, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices, such as the network service 102, subscriber device 110, access manager 118, and database 126, generally include computer-executable instructions (e.g., service software 104, service client application 112, etc.), where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the database 126, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. As one example, at least a portion of the functionality of the network service 102 described herein may be implemented by way of the service software 104. As another example, at least a portion of the functionality of the subscriber device 110 described herein may be implemented by way of the service client application 112.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. For example, aspects of the aforementioned functionality of the network service 102, access manager 118 and database 126 may be combined in various manners, or differently located or grouped. Moreover, many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device configured to execute a program by a hardware processor of the computing device to provide operations comprising:
receiving an authentication request from a subscriber device, the authentication request including a user credential and a device identifier of the subscriber device;
validating, by the hardware processor, the authentication request based at least in part on how often the included user credential has been used in a predetermined time period and a device location according to a network base station that is consistent with usage of the subscriber device;
when the authentication request is validated, providing, by the hardware processor, an authentication reply to the subscriber device indicative of allowance of the subscriber device to access the network service, the authentication reply including a hash token generated by use as inputs to a hashing algorithm the device identifier of the subscriber device and a periodically-updated salt value generated according to a subscriber device characteristic including both a network connectivity type and an operating system type of the subscriber device, the hash token and the periodically-updated salt value of the authentication reply being used in validation of subsequent authentication requests without requiring reentry of the included user credential.

2. The computing device of claim 1, the operations further comprising:
receiving a subsequent authentication request from the subscriber device, the subsequent authentication request including the device identifier of the subscriber device and the hash token;
generating a second hash token based on the device identifier of the subsequent authentication request;
validating the subsequent authentication request according to the hash token and the second hash token; and
when the subsequent authentication request is validated, allowing the subscriber device to access the network service without requiring reentry of the user credential.

3. The computing device of claim 1, wherein a periodically-updated salt value is maintained by the network service.

4. The computing device of claim 3, the operations further comprising applying the periodically-updated salt value at a predefined interval to generate hash tokens, thereby invalidating the hash token generated based on the device identifier.

5. The computing device of claim 1, wherein validating the authentication request includes confirming that at least one of the user credential and the device identifier of the authentication request does not exceed a maximum use count in authentication requests during a constrained period of time.

6. The computing device of claim 1, wherein the user credential includes a passphrase, and wherein validating the authentication request includes validating the passphrase using user information in a subscriber database.

7. The computing device of claim 1, wherein the device identifier to be hashed includes at least two of a mobile device number of the subscriber device, an Internet protocol address of the subscriber device, and an element of information included on a subscriber identity module utilized by the subscriber device, and
wherein the user credential includes at least one element of information entered into the subscriber device by a user of the device when creating the authentication request.

8. A method, comprising:
receiving an authentication request from a subscriber device by a network service, the authentication request including a user credential and a device identifier of the subscriber device;
validating the authentication request based at least in part on how often the included user credential has been used in a predetermined time period and a device location according to a network base station that is consistent with usage of the subscriber device;

when the authentication request is validated, providing an authentication reply to the subscriber device indicative of allowance of the subscriber device to access the network service, the authentication reply including a hash token generated by use as inputs to a hashing algorithm the device identifier of the subscriber device and a periodically-updated salt value generated according to a subscriber device characteristic including both a network connectivity type and an operating system type of the subscriber device, the hash token and the periodically-updated salt value of the authentication reply being used in validation of subsequent authentication requests without requiring reentry of the included user credential.

9. The method of claim 8, further comprising:
receiving a subsequent authentication request from the subscriber device, the subsequent authentication request including the device identifier of the subscriber device and the hash token;
generating a second hash token based on the device identifier of the subsequent authentication request;
validating the subsequent authentication request according to the hash token and the second hash token; and
when the subsequent authentication request is validated, allowing the subscriber device to access the network service without requiring reentry of the user credential.

10. The method of claim 8, wherein periodically-updated salt value is maintained by the network service.

11. The method of claim 10, further comprising applying the periodically-updated salt value at a predefined interval to generate hash tokens, thereby invalidating the hash token generated based on the device identifier.

12. The method of claim 8, wherein validating the authentication request includes confirming that at least one of the user credential and the device identifier of the authentication request does not exceed a maximum use count in authentication requests during a constrained period of time.

13. The method of claim 8, wherein the user credential includes a passphrase, and wherein validating the authentication request includes validating the passphrase using user information in a subscriber database.

14. The method of claim 8, wherein the device identifier to be hashed at least two of a mobile device number of the subscriber device, an Internet protocol address of the subscriber device, and an element of information included on a subscriber identity module utilized by the subscriber device, and wherein the user credential includes at least one element of information entered into the subscriber device by a user of the device when creating the authentication request.

15. A non-transitory computer-readable medium tangibly embodying computer-executable instructions of a program, the program being executable by a processor of a computing device to provide operations comprising:
receiving an authentication request from a subscriber device, the authentication request including a user credential and a device identifier of the subscriber device;
validating the authentication request based at least in part on how often the included user credential has been used in a predetermined time period and a device location according to a network base station that is consistent with usage of the subscriber device;

when the authentication request is validated, providing an authentication reply to the subscriber device indicative of allowance of the subscriber device to access the network service, the authentication reply including a hash token generated by use as inputs to a hashing algorithm the device identifier of the subscriber device and a periodically-updated salt value generated according to a subscriber device characteristic including both a network connectivity type and an operating system type of the subscriber device, the hash token and the periodically-updated salt value of the authentication reply being used in validation of subsequent authentication requests without requiring reentry of the included user credential.

16. The computer-readable medium of claim 15, further executable by the computing device to perform operations comprising:
receiving a subsequent authentication request from the subscriber device, the subsequent authentication request including the device identifier of the subscriber device and the hash token;
generating a second hash token based on the device identifier of the subsequent authentication request;
validating the subsequent authentication request according to the hash token and the second hash token; and
when the subsequent authentication request is validated, allowing the subscriber device to access the network service without requiring reentry of the user credential.

17. The computer-readable medium of claim 15, wherein the a periodically-updated salt value is maintained by the network service.

18. The computer-readable medium of claim 17, further executable by the computing device to perform operations comprising applying the periodically-updated salt value at a predefined interval to generate the hash token, thereby invalidating the hash token generated based on the device identifier.

19. The computer-readable medium of claim 15, wherein validating the authentication request includes confirming that at least one of the user credential and the device identifier of the authentication request does not exceed a maximum use count in authentication requests during a constrained period of time.

20. The computer-readable medium of claim 15, wherein the user credential includes a passphrase, and wherein validating the authentication request includes validating the passphrase using user information in a subscriber database.

21. The computer-readable medium of claim 15, wherein the device identifier to be hashed includes at least two of a mobile device number of the subscriber device, an Internet protocol address of the subscriber device, and an element of information included on a subscriber identity module utilized by the subscriber device, and wherein the user credential includes at least one element of information entered into the subscriber device by a user of the device when creating the authentication request.

* * * * *